April 20, 1965     L. W. FROST ETAL     3,179,635
LINEAR POLYMERIC AMIDE-MODIFIED POLYIMIDES
AND PROCESS OF MAKING SAME
Filed July 8, 1963

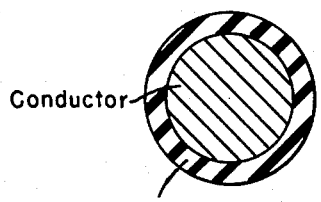

Conductor

Fig. 1.

Insulation Coating Comprising a Linear
Polymeric Polyimide Prepared from
Primary Aromatic Diamines and Pyromellitic
Dianhydride.

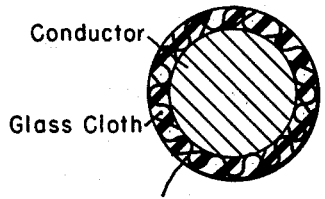

Conductor

Glass Cloth

Fig. 2.

Insulation Coating Comprising a Linear
Polymeric Polyimide Prepared from
Primary Aromatic Diamines and Pyromellitic
Dianhydride.

INVENTORS
Lawrence W. Frost and
George M. Bower
BY
William J. Addison
ATTORNEY

United States Patent Office 3,179,635
Patented Apr. 20, 1965

3,179,635
LINEAR POLYMERIC AMIDE-MODIFIED POLY-
IMIDES AND PROCESS OF MAKING SAME
Lawrence W. Frost, Murrysville, and George M. Bower,
Pittsburgh, Pa., assignors to Westinghouse Electric Corporation, Pittsburgh, Pa., a corporation of Pennsylvania
Filed July 8, 1963, Ser. No. 295,279
13 Claims. (Cl. 260—78)

The present invention relates to the preparation of resinous linear polymers and has particular reference to the preparation of linear polymeric amide-modified polyimides by the reaction of a suitable dianhydride and amide-modified aromatic diamines. This application is a continuation-in-part of our copending application Serial No. 2,029, filed January 12, 1960, now abandoned.

The linear polymers of the present invention are characterized by extraordinarily high thermal and oxidative stability, good film forming properties, toughness, and other properties which make them particularly suitable for use as wire coatings, molding and laminating resins, films for electrical insulating or mechanical use, varnish components, and the like.

For a more complete understanding of the present invention, reference is made to the following detailed description taken in conjunction with the accompanying drawing wherein:

FIGURE 1 is a cross-sectional view of an electrical conductor provided with insulation in accordance with our invention; and FIG. 2 also is a cross-sectional view showing a modification of the invention.

In general, the resins of our invention comprise linear amide-modified polyimides containing the repeating unit:

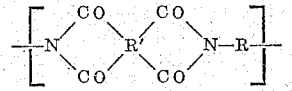

in which R represents a divalent radical selected from the group consisting of

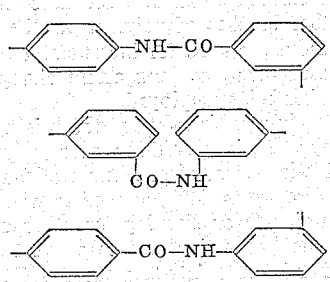

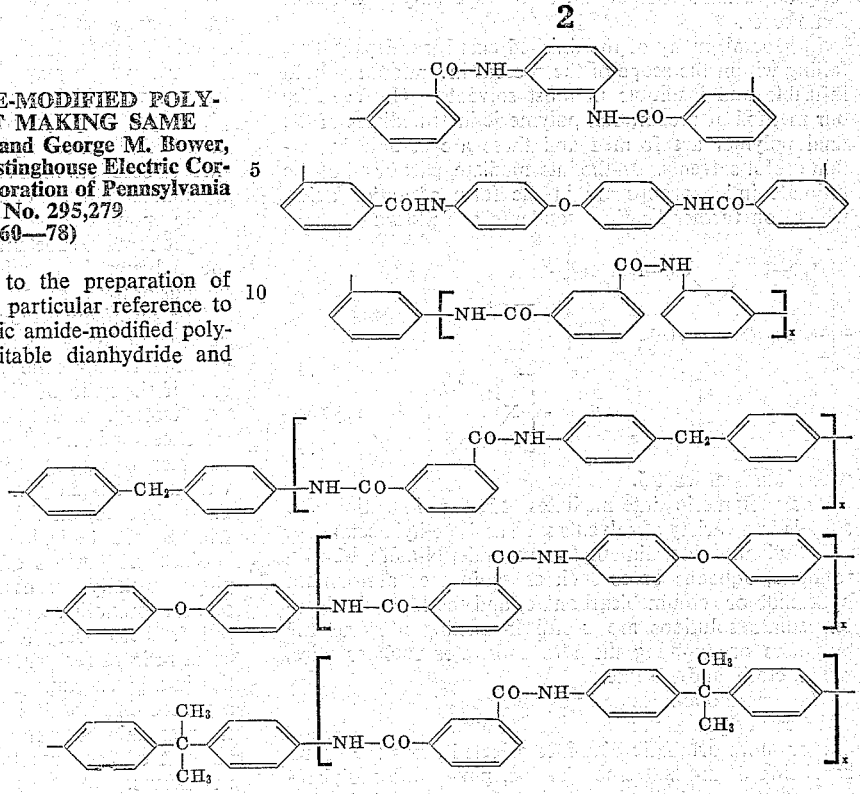

in which $x$ is an integer of from 1 to about 500, and in which R′ represents a tetravalent radical selected from the group consisting of

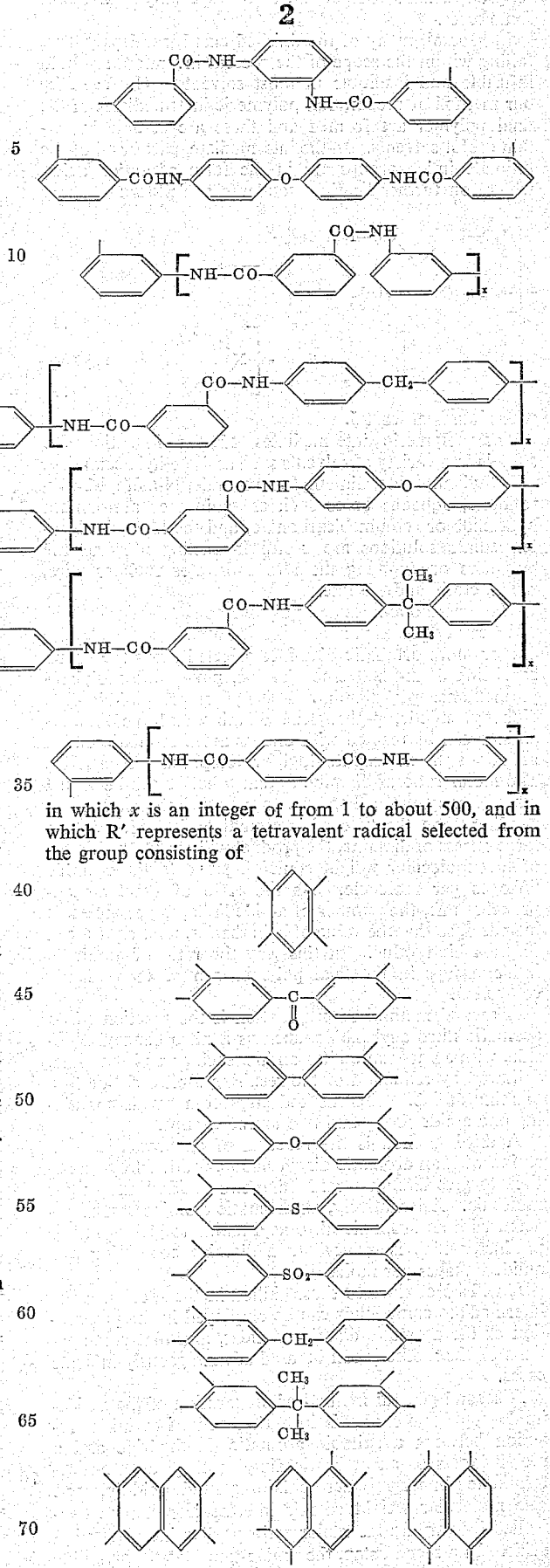

copolymers, containing two or more of these R and/or R' groups, have been found to be especially valuable in some cases.

In general, many of the finished cured, solid polymers, falling within the scope of the present invention, are both infusible and insoluble in most solvents. However, by our method of preparation polymeric intermediates of the final polymer are formed and these are soluble in certain useful solvents. In the intermediate, part or all of the ultimate imide groups are in the form of amido acids, which, on further heating, condense as follows:

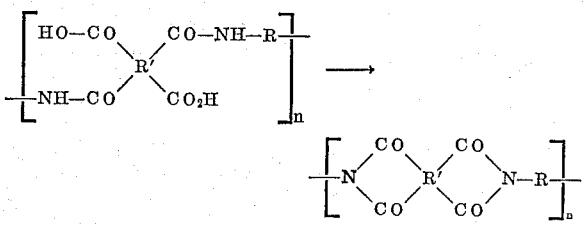

wherein $n$ is at least 5.

The polymeric intermediates of our invention are soluble in a variety of solvents such as dimethyl acetamide, dimethyl sulfoxide, dimethyl formamide, N-methyl-2-pyrrolidone, aqueous bases such as sodium or ammonium hydroxide or sodium bicarbonate, and the like. Such intermediate solutions are useful in casting films of the polymers or applying them to substrates such as wire, fillers, cloth, and the like.

The diamino amides and polyamides listed in column 1 and 2 can be prepared in a variety of ways. For example, one or more aromatic diamines selected from the group consisting of m-phenylene diamine, p,p'-diamino diphenyl methane, p,p'-diamino diphenyl ether, p,p'-diamino diphenyl sulfide, p-phenylene diamine and the like diamines can be reacted with one or more aromatic diacyl halides, such as isophthaloyl or terephthaloyl chloride. The molar ratio of diamine to diacyl halide can be varied from slightly more than one to a very large excess, depending upon the type of intermediate desired. With a large excess of diamine, the product will tend to be largely of low molecular weight containing two to three amide linkages per molecule. As the ratio of reactants approaches one, the number of amide linkages per molecule increases, so that the value of X in the formulas shown can reach a high value. In this way the ratio of amide to imide groups in the final polymer can be conveniently controlled.

A second method of preparation is the reaction of an aromatic nitro acyl halide, such as a nitro benzoyl chloride, with an aromatic nitro amine, such as a nitroaniline, followed by reduction of the resulting dinitro amide to a diamino amide. This method gives compounds containing one amide group and two amino groups.

A third method is the reaction of an aromatic nitro amine with an aromatic diacyl halide, followed by reduction, to give diamines containing two amide linkages per molecule. Alternatively, an aromatic diamine can be reacted with an aromatic nitro acyl halide to give a dinitro product, which is reduced to a diamine containing two amide linkages per molecule.

It will be obvious to those skilled in the art that other intermediate compounds can be employed in the preparation of the aromatic diamino amides, and that combinations of the methods can be used advantageously in some cases.

A second general method of preparation of the amide-imide copolymers of this invention comprises initial reaction between a suitable aromatic dianhydride and a molar excess of an aromatic diamine to give an amine-terminated linear polymer containing amide acid linkages. The molecular weight of this intermediate can be controlled by varying the molar ratio of diamine to dianhydride. In a second step, the amine-terminated polyamide acid is reacted with an aromatic diacyl halide to give a soluble high polymer containing amide links as well as amide acid links. Dehydration by heat or chemical means converts the latter to imide links and gives a substantially insoluble and infusible product.

For most purposes, it is desirable that the polymers have a very high molecular weight. In general, for a given type of polymer, high molecular weight is associated with high strength and toughness, high viscosity of melt or solution, high softening point, as well as improved thermal stability. It also is desirable that the polymer be stable upon prolonged storage, that is, that the molecular weight remain substantially constant when a solution of the polymer is permitted to stand for relatively long periods of time at room temperature.

The surprising discovery now has been made that linear polymers of very high, relatively stable molecular weight are obtained upon the reaction of dianhydride and diamine only if the ratio of diamine to dianhydride is controlled very closely. More particularly, it is necessary to avoid an excess of the dianhydride in order to prevent the polymer from degrading to one of a lower molecular weight on standing in solution. If an excess of the diamine is used, on the other hand, the molecular weight will be more stable, but relatively lower.

Since the purities of the chemicals and reactants employed usually are not known accurately, varying from one lot to another as well as changing somewhat on storage, it is necessary to first determine experimentally the exact ratio of reactants required to give optimum properties in a given run. If pure reactants are available, they are used in substantially equimolar amounts. We will now explain a method to follow in determining the amount of each reactant to use, assuming its purity is not known.

In accordance with the present invention linear polymers are prepared by stirring a solution of the amide-modified primary aromatic diamine in a suitable solvent such as dimethyl acetamide at a temperature below about 150° C. while adding, for example, pyromellitic dianhydride, benzophenone tetracarboxylic dianhydride, or the like in small increments. As the quantities of dianhydride are added to the solution, the viscosity of the solution will rise. It will be understood, of course, that the viscosity of the solution is a measure of the molecular weight of the solute. As more and more dianhydride is added to the solution, the resultant mixture increases in viscosity until a well defined maximum point is reached. Thereafter, the viscosity, surprisingly, decreases again. In order to obtain a polymer of maximum high and stable molecular weight, it is necessary to stop the addition at, or just before, the point at which maximum viscosity is reached. Although the reaction is rapid at temperatures around 25°–50° C., some time is required for the viscosity to stabilize after the addition of each increment of dianhydride. This generally occurs in ten minutes to one hour at 40° C. as long as the diamine is in excess. When the optimum point is passed and the viscosity begins to decrease on further addition of dianhydride, the time required to reach equilibrium viscosity is much greater, apparently being of the order of a few weeks.

Once the optimum ratio of dianhydride to diamine has been established for a given lot of raw materials, for example, in accordance with the procedure set forth hereinabove, further batches of polymer can be prepared at that ratio without the need for incremental additions and viscosity measurement, as long as no change occurs in the raw materials being employed.

Once the optimum viscosity of the mixture has been obtained, the result is a solution of a polymeric intermediate. This is a clear viscous mass of material which may be cast directly as films, applied to wires, employed in making laminates or sleeving, or other electrical insulation and the like and heated to convert the resinous soluble polymer intermediate to a cured, solid and insoluble polymer.

EXAMPLE I

A solution containing 32 grams of m-phenylene diamine, 75 grams of borax, 10 grams of sodium sulfite and 1600 grams of water was stirred vigorously while a solution of 15 grams of isophthaloyl chloride and 5 grams of terephthaloyl chloride in 1000 grams of xylene was added rapidly. The mixture was stirred for two minutes and the precipitated polymer was filtered off. A second run was made in the exact same way. The products of the two runs were combined, washed twice with water, and once with acetone, and then dried for 1 hour at 150° C. to give a gray powder weighing 48 grams. This material appears to include molecules of various chain lengths, but the average composition was found to correspond to about 1.33 mols of diamine per mol of combined iso- and terephthalate. Thus, the average molecule contained seven benzene rings, six amide groups, and two amino groups.

EXAMPLE II

A solution of 11.5 grams of the product of Example I was dissolved in 100 grams of dimethyl acetamide with stirring while pyromellitic dianhydride (PMDA) was added in small increments. The reaction temperature varied from 45° to 50° C. About 10 minutes after each addition of dianhydride the viscosity of a sample of the solution was measured at 25° C. The viscosity measurements were as follows.

| Total PMDA,[1] g.: | Visc. at 25°, stks. |
|---|---|
| 2.0 | .5 |
| 2.2 | .5 |
| 2.4 | 1.1 |
| 2.6 | 3.4 |
| 2.7 | 5.5 |
| 2.8 | 6.4 |
| 2.9 | 7.6 |
| 3.1 | 6.4 |
| 3.1 72 hours later | 6.0 |

[1] Pyromellitic dianhydride.

Clear yellow films weighing up to 0.4 gram were easily cast in 55 millimeter diameter aluminum dishes on baking at 150° C. for two hours followed by baking at 200° C. for one hour. These films were tough and flexible. They could be stripped from the dish intact and withstood repeated creasing and flexing without cracking. A thicker film, weighing 1.1 grams and having a thickness of 12 mils was cast by baking for 20 hours at 150° C. followed by a 24 hour bake at 175° C. and finally by a 4 hour bake at 200° C. The film was clear amber, free from bubbles, flexible, and tough enough to withstand considerable flexing.

EXAMPLE III

A solution of 32.4 grams of m-phenylene diamine, 33.3 grams of triethylamine and 400 grams of dimethyl acetamide was stirred while 30.5 grams of isophthaloyl chloride were added slowly. The reaction temperature reached 64° C. spontaneously. The mixture then was cooled and filtered to remove the precipitate of triethylamine hydrochloride. The filtrate was diluted to a total weight of 531 grams with dimethyl acetamide. The solution was stirred while pyromellitic dianhydride was added slowly. A maximum viscosity of 11.5 stokes was reached when 31.8 grams of the dianhydride has been added. The resultant clear yellow material could be cast into continuous films.

EXAMPLE IV

The method of Example III was repeated using 43.2 grams of m-phenylene diamine, 79 grams of triethylamine, 400 grams of dimethyl acetamide and 72.1 grams of isophthaloyl chloride in the first step. After dilution to 650 grams with dimethyl acetamide, a total of 10.35 grams of pyromellitic dianhydride was added, giving a product having a maximum viscosity of 3.1 stokes. This material, when cast into a film and baked at 150° C. gave a polymeric solid.

EXAMPLE V

A solution of 34.6 grams of m-phenylene diamine in 400 grams of dimethyl acetamide was stirred while a mixture of 36.5 grams of isophthaloyl chloride and 12.2 grams of terephthaloyl chloride was added slowly. Stirring was continued while 53.5 grams of anhydrous sodium carbonate was added. Stirring was continued for two more hours. The mixture was filtered and the filtrate was stirred while a total of 19.8 grams of pyromellitic dianhydride was added thereto. A maximum viscosity of 0.5 stoke was reached. This material could be cast into a continuous film which hardened upon heating at 150° C.

EXAMPLE VI

A solution of 34.6 grams of m-phenylene diamine, 300 grams of dimethyl acetamide and 49 grams of triethyl amine was stirred while a solution of 36.5 grams of isophthaloyl chloride, 12.2 grams of terephthaloyl chloride and 100 grams of xylene was added thereto over a period of 10 minutes while the temperature was held at 35–40° C. with a cooling coil. The mixture was filtered and the filtrate was diluted to 530 grams with dimethyl acetamide. Pyromellitic dianhydride was added to this solution in small increments, with continued stirring until 17.95 grams had been added and a viscosity of 12.0 stokes had been reached. The solution was diluted with 33 grams of xylene giving a clear amber solution containing 15% solids in a 3:1 dimethyl acetamide-xylene mixture. A three mil thick film cast from this solution was clear and tough and could be creased repeatedly without cracking. A 10 mil thick film was slightly hazy and cracked when creased, although it could stand a considerable amount of flexing. A 16 mil thick film was rather cloudy and moderately flexible.

EXAMPLE VII

A solution of 47.5 grams of 4,4′-methylene dianiline, 29 grams of triethylamine and 450 grams of dimethyl acetamide was stirred while a mixture of 18.3 grams of isophthaloyl chloride and 6.1 grams of terephthaloyl chloride was added thereto. The mixture was filtered, using diatomaceous earth as a filter aid. On standing overnight, the filtrate deposited a considerable amount of crystalline solid. The filtrate, including the crystalline solid, was stirred vigorously while 24.3 grams of pyromellitic dianhydride was added. Since the solution was still very cloudy, although quite viscous, it was filtered again, and more pyromellitic dianhydride was added to the filtrate with continued stirring. The total amount of dianhydride added was 24.9 grams and the final viscosity of the solution was 4.4 stokes. The product was a clear amber solution from which clear, tough, flexible films were cast.

Examples VIII and IX illustrate a method in which an amine-terminated imide intermediate is first made and then reacted through the amine groups with a dibasic acid halide. Broadly, according to this technique, the dianhydride is reacted with a molar excess of at least one primary aromatic diamine in the presence of a solvent. This product so produced will have free amino groups thereon. The product is reacted with an aromatic dibasic acid halide in an amount sufficient to react with substantially all of the free amino groups on that product. The result is a soluble polymeric intermediate which may be converted to a solid, cured material on heating.

EXAMPLE VIII

A solution of 10.8 grams of m-phenylene diamine in 100 milliliters of dimethyl acetamide was stirred while 10.9 grams of pyromellitic dianhydride was added. A clear solution was obtained, to which was added a solution of 4 grams of sodium hydroxide dissolved in 250 milliliters of water. This solution was stirred rapidly while a solution of 10.15 grams of isophthaloyl chloride in 150 milliliters of xylene was added. The resulting polymer was filtered off, washed with water, xylene and acetone, and then dried for 30 minutes at 150° C. A white powder, weighing 29.7 grams, was obtained. This powder was dissolved in dimethyl sulfoxide. The resultant solution then was cast in the form of a clear, flexible film.

EXAMPLE IX

A solution of 19.8 grams of 4,4'-methylene dianiline in 100 milliliters of dimethyl acetamide was stirred while 10.8 grams of pyromellitic dianhydride was added. To the resulting clear solution was added a solution of 4 grams of sodium hydroxide dissolved in 250 milliliters of water. A precipitate formed which was largely dissolved by adding 100 milliliters of dimethyl acetamide. The mixture was stirred rapidly while a solution of 10.15 grams of isophthaloyl chloride in 150 milliliters of xylene was added rapidly. The polymer which precipitated was filtered off, washed with water, xylene, and carbon tetrachloride and then was air-dried over-night. The product was a yellow powder from which clear, flexible, thin films were cast, using dimethyl acetamide as a solvent.

Examples X–XIII illustrate the preparation of amide-imide copolymers by another method, in which pure amide-containing diamines are prepared and then reacted with a dianhydride. These compounds are block polymers. They are more regular in structure than the random amide-imides previously described. In preparing these compounds, there first is prepared a dinitro aromatic compound having from 1 to 2 amide linkages per molecule. This is prepared by reacting an aromatic acid halide such as a diacyl halide or nitro acyl halide with a substantially stoichiometric amount of a suitable compound, either a nitro amine or a primary aromatic diamine. The dinitro aromatic compound is reduced as, for example, by hydrogenation, to the corresponding diamino aromatic compound. The diamino compound then is dissolved in a suitable solvent and reacted with a substantially equimolar amount of a dianhydride.

EXAMPLE X

Two mols of m-nitroaniline were dissolved in an acetic acid-water solution together with 2 mols of sodium hydroxide. With vigorous stirring, there was added to the solution 1 mol of isophthaloyl chloride dissolved in xylene. The precipitate which formed was filtered and washed successively with dilute aqueous sodium hydroxide, dilute aqueous hydrochloric acid, and with water. A 90% yield of isophthal-m-nitroanilide was obtained after drying for 24 hours at 150° C. The isophthal-m-nitroanilide then was hydrogenated to isophthal-m-aminoanilide in 82% yield using a Raney nickel catalyst. The reduction was effected in the presence of a solvent composed of 1 part γ-butyrolactone and 10 parts ethanol. 74 grams of isophthal-m-amino-analide was then dissolved in 372 grams of dimethyl acetamide. To this was added 44.5 grams of pyromellitic dianhydride. Total addition time was approximately 1 hour. The solution was diluted by the addition of 124 grams of dimethyl acetamide. Increments of pyromellitic dianhydride and dimethyl acetamide were added and the viscosity measured as shown in Table 1 below:

*Table I*

| Total PMDA[1] (g.) | Total DMA[2] (g.) | Viscosity, stokes |
|---|---|---|
| 47 | 496 | 10 |
| 47.3 | 565 | 9 |
| 47.6 | 650 | 10 |
| 47.9 | 650 | 10 |

[1] Pyromellitic dianhydride.
[2] Dimethyl acetamide.

Tough, flexible films were prepared from this solution.

EXAMPLE XI

One mol of m-phenylene diamine was dissolved in water with two mols of sodium hydroxide. While stirring vigorously, there was added to the solution two mols of m-nitrobenzoyl chloride. The resulting N,N'-bis(m-nitrobenzoyl)-m-phenylene diamine was washed with dilute aqueous sodium hydroxide, dilute aqueous hydrochloric acid, and water and then dried at 150° C. The product was obtained in 90% yield.

The N,N'-bis(m-nitrobenzoyl)-m-phenylene diamine was hydrogenated to N,N'-bis(m-aminobenzoyl)-m-phenylene diamine with a Raney nickel catalyst to give a 69% yield. The hydrogenation solvent was composed of 3 parts of γ-butyrolactone and 20 parts ethanol.

34.6 grams of N,N'-bis(m-aminobenzoyl)-m-phenylene diamine was dissolved in 170 grams of dimethyl acetamide. A total of 19.5 grams of pyromellitic dianhydride was added initially over a 10 minute period. Additional increments of the dianhydride were added at 15 minute intervals. The total amount of dianhydride and the viscosity of the resulting solutions are set forth in Table II below.

*Table II*

| Total PMDA[1] (g.): | Viscosity (stokes) |
|---|---|
| 19.5 | 2.5 |
| 20.0 | 4.3 |
| 20.5 | 9.7 |
| 20.7 | 14 |
| 20.8 | 19 |

[1] Pyromellitic dianhydride.

Films cast from this solution were tough and flexible.

EXAMPLE XII

One mol of m-nitroaniline and one mol of sodium hydroxide were dissolved in an acetic acid-water solution. To this vigorously stirred solution was added one mol of p-nitrobenzoyl chloride dissolved in xylene. The solid precipitate which formed was washed successively with dilute aqueous sodium hydroxide, dilute aqueous hydrochloric acid, and water and then was dried at 150° C. A 90% yield of p-nitrobenz-m-nitroanilide was obtained. This product was then hydrogenated to p-amino-benz-m-aminoanilide in a 60% yield with Raney nickel as the catalyst. 2.39 grams of p-aminobenzoyl-m-aminoanilide then was dissolved in 18 grams of dimethyl acetamide. To this solution was added 2.19 grams of pyromellitic dianhydride. A moderately viscous solution resulted. Thin continuous films were obtained from this solution.

EXAMPLE XIII

One mol of p,p'-diaminophenyl ether and 2 mols of sodium hydroxide were dissolved in an acetic acid-water solvent. To this solution was added with vigorous stirring 2 mols of m-nitrobenzoyl chloride dissolved in xylene. The solid material which separated was filtered off and then washed successively with dilute aqueous sodium hydroxide, dilute aqueous hydrochloric acid, and with water. After drying at 150° C. the product, bis(m-nitrobenzoyl)-p,p'-diaminophenyl ether, was obtained in a yield of 93%. This material then was hydrogenated to give a yield of 76% of bis(m-aminobenzoyl)-p,p'-diaminophenyl ether using 5% platinum-on-charcoal as a catalyst. 4.4 grams of the product so obtained then was dissolved in 21 grams of dimethyl acetamide. To this there was added 2.2 grams of pyromellitic dianhydride with stirring. The solution became quite viscous so 70 grams of dimethyl acetamide was added. Films obtained from this solution were strong and flexible.

EXAMPLE XIV

In order to make weight loss measurements of the cured polymers, test samples were made by placing sufficient quantities of the intermediate polymeric solutions prepared in the above examples, to give 0.06 to 0.16 gram of solid, in weighed flat-bottomed aluminum dishes, 55 millimeters in diameter. The samples were baked initially for about two hours at 150° C., then for one hour at 200° C., and finally for one hour at 250° C. The samples then were weighed and placed in a forced draft oven maintained at 300° C. Periodic measurements were made of weight loss, with the following results:

*Table III*

| Polymer from Example | Wt. Loss, Percent | | |
|---|---|---|---|
| | III | VI | X |
| Time, Days: | | | |
| 1 | 5.7 | 6.0 | 4.7 |
| 6 | 12 | 10 | 5.2 |
| 15 | | | 5.3 |
| 24 | | | 5.5 |
| 42 | | | 6.8 |

EXAMPLE XV

A mixture of 86.5 grams of m-phenylene diamine, 255 grams of anhydrous sodium carbonate, and 400 grams of dimethyl acetamide was stirred rapidly while a solution of 91.4 grams of isophthaloyl chloride, 30.5 grams of terephthaloyl chloride and 200 grams of xylene was added slowly. The mixture was cooled during the addition to keep the temperature below 45° C. After stirring for two hours, the mixture was filtered, diluted with 1240 grams of dimethyl acetamide, stirred for thirty minutes with fresh sodium carbonate and then filtered again.

The filtrate thus obtained was divided into two equal parts. One part was stirred rapidly while pyromellitic dianhydride was added in small portions until a total of 22.1 grams had been added and the viscosity had reached 1020 centistokes at 38° C. The other portion of the filtrate was stirred while an equal quantity of pyromellitic dianhydride was added in one portion. Stirring of the second portion was continued until a clear solution was obtained. This then was combined with the first portion to give 1300 grams of a solution having a viscosity of 885 centistokes at 35° C. and a solids content of 15%.

EXAMPLE XVI

A solution of 54 grams of m-phenylene diamine, 101 grams of triethylamine, and 214 grams of dimethyl acetamide was stirred rapidly with cooling while a solution of 76.1 grams of isophthaloyl chloride, 25.4 grams of terephthaloyl chloride, and 143 grams of xylene was added slowly thereto. The resulting viscous mixture was diluted with an additional 318 grams of dimethyl acetamide and then filtered. A portion of the filtrate, containing 48.3% of the total, was stirred rapidly while a total of 1.8 grams of pyromellitic dianhydride was added in small portions. A clear solution was obtained having a 15% solids content and a viscosity of 413 centistokes at 50° C.

EXAMPLE XVII

A solution composed of 138 grams of p-nitroaniline, 85 grams of sodium hydroxide, 1800 milliliters of acetic acid, and 1000 milliliters of water was placed in a large Waring Blendor. To this solution was added another solution composed of 190 grams of m-nitrobenzoyl chloride dissolved in 800 milliliters of xylene. A copious precipitate formed and more water was added to facilitate stirring. After about five minutes the mixture was filtered and washed with water. The solid precipitate was stirred with an aqueous sodium hydroxide solution, filtered, stirred with an aqueous hydrochloric acid solution, filtered, and finally stirred with warm water. After a final filtration, the solid m-nitrobenzoyl-p-nitroanilide was dried at 100° C. for 16 hours. The average yield of several runs was about 80 to 90%.

A mixture composed of 14 grams of m-nitrobenzoyl-p-nitroanilide, 225 milliliters of ethyl acetate and about 0.3 gram of 5% palladium-on-carbon catalyst was placed in a hydrogenation flask which was attached to a Parr low pressure hydrogenation apparatus. After up-take of hydrogen ceased the hot solution was filtered. The solution was concentrated and the remaining solid material collected by vacuum filtration. The average yield of several runs was 75-85% of m-aminobenzoyl-p-aminoanilide.

A solution composed of 35 grams of the m-aminobenzoyl-p-aminoanilide product thus prepared and 206 grams of dimethyl acetamide was placed in a small Waring Blendor. To this solution was added 32 grams of pyromellitic dianhydride over a five-minute period. Eight successive 0.1 gram portions of the dianhydride were added to the solution. After each addition of the dianhydride, the viscosity of the solution increased markedly. No more dianhydride was added after the rate of increase of viscosity appeared to be decreasing.

The composition of Examples XV, XVI and XVII may be used advantageously in formulating laminates, sleeving, and wire enamels for use in the electrical industry.

The clear polymeric intermediate composition of Example XVII, in addition to being castable in the form of films, also provides a very suitable wire enamel. As an example, this composition was applied to various lengths of No. 17 A.W.G. copper wire in thickness of up to several mils. The wire thus coated has been passed through a heated baking tower at a rate of 12-19 feet per minute. The temperature within the tower has varied from 200-400° C. The enamel composition coated smoothly and had good flexibility over a wide baking range. Particularly satisfactory results have been obtained when the wire was post-baked for from ½-1 hour at 250-300° C.

Twisted samples of wire coated as described above have been tested for thermal stability according to American Institute of Electrical Engineering Test No. 57 at temperatures of 325, 300, 275, 250, and 225° C. The extrapolated thermal life of this enamel, as determined from an average of ten samples tested at each temperature given was 100,000 hrs. at 210° C. The enamel had a scrape hardness of 54 ounces using a 9 millimeter diameter knife edge when tested in the tester described in U.S. Patent 2,372,093 and had a dielectric strength of from 4000 to 8000 volts.

FIGURE 1 of the drawing illustrates a conductor wire having an insoluble coating of the enamel composition of this invention deposited thereon. It is to be understood that the invention is not limited to the application of only the new insulation directly upon the conductor. Thus, as illustrated in FIG. 2, the new insulation may be applied to a glass served wire in which the conductor is covered with glass cloth impregnated with the insulation of this invention.

EXAMPLE XVIII

Films were cast from the three resins described in Examples XV, XVI and XVII by spreading the resin solution obtained in each example evenly on a sheet of plate glass. The sheets then were suspended horizontally in an oven at room temperature. The oven temperature was increased to 150° C. in thirty minutes and then maintained at 150° C. for a period of from about 2 to 20 hours. The films were allowed to cool and then were stripped from the sheets of glass. All samples were clear yellow in appearance, as well as being strong and flexible. They varied in thickness from 0.001 to 0.01 inch and were characterized by extremely high thermal stability.

Electrical properties of the films described hereinabove are set forth in the following tables:

TABLE IV.—DIELECTRIC CONSTANT AND DISSIPATION FACTOR OF ONE MIL FILMS

| Example | Freq., c.p.s. | Temp., °C. | 100×Tan | Dielectric Constant |
|---|---|---|---|---|
| XV | 60 | 27 | 3.39 | 7.50 |
| XV | 1,000 | 27 | 2.57 | 7.07 |
| XV | 10,000 | 27 | 2.99 | 6.75 |
| XV | 60 | 125 | 12.4 | 7.41 |
| XV | 1,000 | 125 | 7.54 | 6.06 |
| XV | 10,000 | 125 | 4.52 | 5.60 |
| XVI | 60 | 27 | 4.31 | 7.41 |
| XVI | 1,000 | 27 | 3.11 | 6.97 |
| XVI | 10,000 | 27 | 3.44 | 6.68 |
| XVI | 60 | 125 | 10.4 | 7.20 |
| XVI | 1,000 | 125 | 4.72 | 6.36 |
| XVI | 10,000 | 125 | 3.13 | 6.03 |

TABLE V.—DIELECTRIC STRENGTH OF ONE MIL FILMS

| Example | Temp., °C. | Diel. Strength, k.v. (D.C.) per Mil |
|---|---|---|
| XV | 25 | 4.5 |
| XV | 200 | 4.0 |
| XVI | 25 | 5.5 |
| XVI | 200 | 4.5 |

These films may also be prepared in an uncured or semi-cured state, in which they are tack-free at room temperature, stable on storage and very strong and flexible, but are partially or completely soluble in certain solvents, and can be fused or sintered upon the application of heat and sometimes pressures.

The intermediate films have the property of bonding to themselves when adjacent portions are brought into close contact and heated. When fully baked, the films are tough, flexible, substantially infusible, insoluble in ordinary solvents, and very resistant to deterioration by exposure to air at high temperatures. The intermediate films are especially useful as self-bonding wrapping tapes for electrical insulation, heat-sealable containers, and the like.

A film was cast from the solution of Example XVII, after thinning with dimethyl acetamide, by pouring the solution onto a glass plate and then placing the plate in a cold circulating air oven. The oven temperature was raised to 200° C. over a thirty minute period. The cured film thus obtained was strong and flexible. Some strips cut from the film were dipped in the clear solution obtained in Example XVI and air-dried to a tack-free state. These strips then were wrapped around a steel bar one inch in diameter and held in place by a copper wire. The assemblage then was placed in an oven and cured for one hour at 150° C. The film exhibited good adhesion to itself and retained its shape.

EXAMPLE XIX

Films were made from the clear solutions of Examples XV and XVI by spreading the solutions evenly on plate glass, suspending the plate horizontally in an oven, and baking the strips at 50° C. for a period of about two hours. The films were then stripped from the plates. They were very flexible, clear, nearly colorless in appearance, strong, and tack-free. Similar films were prepared by permitting the plates to stand at room temperature for 16 hours and then stripping the films from the plates.

Both the films prepared from Examples XV and XVI were cut into strips about 8 x 0.75 inch. They were wound helically on a 0.75 inch diameter steel mandrel with each turn overlapping the preceding turn by about two-thirds. The final end was anchored with a wire and the assemblage was baked for 18 hours at 150° C. The wrappings then were slit lengthwise and removed from the mandrels. They were found to be strong, flexible, and very well bonded. It was not possible to separate the layers without destroying the films.

EXAMPLE XX

Films, prepared in the manner described hereinabove, from the clear polymeric resin intermediates described in Examples XV and XVII were cut into strips about 10 x 1.25 inches. They were prepared as described in Example XV and allowed to dry overnight at room temperature. The resulting tapes were clear, strong, flexible, and tack-free. They were wound helically about a one and one-quarter inch steel mandrel, each turn overlapping the preceding turn by about half of its width. The final end was anchored with wire and the assembly was baked for two hours at 150° C. The wrapping then was slit lengthwise and removed from the mandrel. It was found that the turns were very well bonded to each other and could not be separated without destroying the tape. Further baking of the bonded tape for two hours at 200° C. caused a slight increase in stiffness and a slight relaxing of the curvature of the piece. The piece did not melt or even soften noticeably upon heating.

A strip of insoluble film made from the resin of the Example XV, said film measuring 0.002 x 0.25 x 4 inches, was suspended in a 200° oven under a tension of 2120 pounds per square inch for 16 hours. The sample elongated 12%. A small amount of necking-down and a slight cloudiness at one point indicated that some orientation had occurred. The sample remained strong and flexible.

The following examples illustrate the preparation of polypyromellitimides containing mixtures of 2 or more amines. These are prepared by adding PMDA to a solution of the two amines in a solvent (DMAC).

EXAMPLE XXI

To a solution of 43 grams of m-phenylene diamine and 91 grams of m-aminobenz-p-aminoanilide in 1750 grams of dimethyl acetamide was added 171.5 grams of pyromellitic dianhydride. A thin solution was obtained. An additional 5 grams of pyromellitic dianhydride was added in several small portions over a period of several hours. A very high viscosity was obtained. A smooth continuous film was cast from this solution at 150°.

EXAMPLE XXII

To a solution of 72 grams 4,4'-diamino phenyl ether and 54.5 grams of m-aminobenz-p-aminoanilide in 1450 grams of dimethyl acetamide was added 125 grams of pyromellitic dianhydride. To this thin solution 6.9 grams of pyromellitic dianhydride was added over a period of several hours. After dilution with 115 grams of dimethyl acetamide this solution had a viscosity of Z-3 on the Gardner scale. A tough and flexible film was cast from this solution at 150° C.

EXAMPLE XXIII

To a solution of 84 grams of 4,4'-diamino phenyl ether and 41 grams of m-aminobenz-p-aminoanilide in 1445 grams of dimethyl acetamide was added 125 grams of pyromellitic dianhydride. To this thin solution 8 grams of pyromellitic dianhydride was added over a period of several hours. After dilution with 115 grams of dimethyl acetamide the solution had a viscosity of Z-5 on the Gardner scale. A tough film was cast from this solution at 150° C.

EXAMPLE XXIV

To a solution of 96 grams of 4,4'-diamino phenyl ether and 27 grams of m-aminobenz-p-aminoanilide in 1435 grams of dimethyl acetamide was added 125 grams of pyromellitic dianhydride. To this thin solution was added 7.8 grams of pyromellitic dianhydride over a period of several hours. After dilution with 115 grams of dimethyl acetamide the solution had a viscosity of Z-4 on the Gardner scale. A tough film was cast from the solution at 150° C.

EXAMPLE XXV

To a solution of 108 grams of 4,4'-diamino phenyl ether and 13.5 grams of m-aminobenz-p-aminoanilide in 1425 grams of dimethyl acetamide was added 125 grams of pyromellitic dianhydride. To this thin solution 9.5 grams of pyromellitic dianhydride was added over a period of several hours. After dilution with 255 grams of dimethyl acetamide this solution had a viscosity of Z-3 on the Gardner scale. A tough film was cast from this solution at 150° C.

The following examples illustrate the preparation of resin blends.

Three resins solutions were prepared:

*Solution No. 1.*—100 grams of 4,4'-diamino phenyl ether dissolved in 1180 grams of dimethyl acetamide was reacted with a total of 111 grams of pyromellitic dianhydride.

*Solution No. 2.*—100 grams of m-aminobenz-p-aminoanilide was dissolved in 1035 grams of dimethyl acetamide and reacted with a total of 97.5 grams of pyromellitic dianhydride.

*Solution No. 3.*—120 grams of n,n'-bis(m-aminobenzoyl)-m-phenylene diamine was dissolved in 986 grams of dimethyl acetamide and reacted with a total of 76.5 grams of pyromellitic dianhydride.

EXAMPLE XXVI

A blend composed of 140 grams of solution No. 1, 650 grams of soltuion No. 2, and 105 grams of solution No. 3 was prepared by stirring the ingredients together. These materials were completely compatible. This material was successfully coated on No. 17 copper wire. A sample of this coated wire could be wrapped around its own diameter without injury to the coating after the wire was elongated 25% by stretching.

EXAMPLE XXVII

A blend composed of 148 grams of solution No. 1, 470 grams of solution No. 2 and 111 grams of solution No. 3 was prepared by stirring the ingredients together. These materials were completely compatible. This material was successfully coated on No. 17 copper wire. A sample of this coated wire could be wrapped around its own diameter without injury to the coating after the wire was elongated 20% by stretching.

The following examples illustrate the preparation of polyamides starting with benzophenonetetracarboxylic dianhydride (BTDA) and one or more diamines.

EXAMPLE XXVIII

To a solution of 136 grams of m-aminobenz-p-aminoanilide dissolved in 670 grams of dimethyl acetamide was added 166 grams of BTDA. Over a period of several hours 31 grams of BTDA and 560 grams of dimethyl acetamide were added. This solution had a viscosity of Z-4 on the Gardner scale. A tough, flexible film was cast from this solution at 150° C.

The intermediate polymer composition of Example XXVIII was coated successfully on No. 17 copper wire. For example a sample of coated wire was prepared by passing the wire through a tower with temperature setting of 350° and 300° C. at the rate of 25 feet per minute. A sample of this coated wire could be wrapped around its own diameter without injury to the coating after the wire was elongated 20%. The thermal life of this enamel at 300° C., according to American Institute of Electrical Engineering Test No. 57 was over 40 hours.

EXAMPLE XXIX

To a solution composed of 30 grams of isophthal-m-aminoanilide in 129 grams of dimethyl acetamide was added 27 grams of BTDA. This solution was quite thin and the addition of 2.4 grams of BTDA increased the viscosity only slightly. A tough, flexible film was cast from this solution at 150° C. Molar ratio of 1:1 amide-imide.

EXAMPLE XXX

To a solution composed of 27 grams of m-phenylene diamine and 114 grams m-aminobenz-p-aminoanilide in 890 grams of dimethyl acetamide was added 235 grams of BTDA. Over a period of several hours 4 grams of BTDA and 100 grams of dimethyl acetamide were added. A tough and flexible film was cast from the resulting solution at 150°. A small sample of this material lost 5% of its initial weight after aging for 400 hours at 325° C.

EXAMPLE XXXI

To a solution composed of 68 grams of m-aminobenz-p-aminoanilide and 60 grams of 4,4'-diamino phenyl ether in 652 grams of dimethyl acetamide was added 166 grams of BTDA. Over a period of several hours 31 grams of BTDA and 700 grams of dimethyl acetamide were added. The resulting solution had a viscosity of Z-4 on the Gardner scale. A film aged for 400 hours at 325° C. suffered a weight loss of 6.3%.

The following examples illustrate the preparation of polymers containing both pyromellitic dianhydride (PMDA) and benzophenonetetracarboxylic dianhydride (BTDA).

EXAMPLE XXXII

To a solution composed of 22.7 grams of m-aminobenz-p-aminoanilide in 150 grams of dimethyl acetamide was added 16.1 grams of BTDA. Over a period of two hours 10.9 grams of PMDA was added. A strong, tough film was cast from this solution at 150° C.

EXAMPLE XXXIII

To a solution composed of 22.7 grams of m-aminobenz-p-aminoanilide in 141 grams of dimethyl acetamide was added 8.1 grams of BTDA. Over a period of two hours 16.9 grams of PMDA was added. A clear continuous film was cast from this solution at 150° C.

EXAMPLE XXXIV

To a solution composed of 22.7 grams of m-aminobenz-p-aminoanilide in 154 grams of dimethyl acetamide was added 24.2 grams of BTDA. To this solution 5.5 grams of PMDA was added. A tough, flexible film was cast from this solution.

EXAMPLE XXXV

To a solution composed of 11.4 grams of m-aminobenz-p-aminoanilide and 10 grams of 4,4'-diamino phenyl ether in 155 grams of DMA was added 16.1 grams of BTDA. Over a two hour period 10.9 grams of PMDA was added. A tough, flexible film was cast from this solution at 150° C.

EXAMPLE XXXVI

To a solution composed of 11.4 grams of m-aminobenz-p-aminoanilide and 10.8 grams of 4,4'-diamino phenyl sulfide in 147 grams of dimethyl acetamide was added 16.1 grams of BTDA. Over a two hour period 10.9 grams of PMDA was added. A tough, flexible film was cast from this solution at 150° C.

EXAMPLE XXXVII

To a solution composed of 11.4 grams of m-aminobenz-p-aminoanilide and 5.4 grams of m-phenylene diamine in 134 grams of dimethyl acetamide was added 16.1 grams of BTDA. Over a two hour period 10.9 grams of PMDA was added. A tough, flexible film was cast from this solution at 150° C.

The following example illustrates the use of 1,4,5,8-naphthalenetetracarboxylic dianhydride:

EXAMPLE XXXVIII

A solution of 11.35 grams of m-aminobenz-p-aminoanilide in 74 grams of dimethylacetamide was stirred while 13.4 grams of 1,4,5,8-naphthalenetetracarboxylic dianhydride was added. Part of the anhydride dissolved at room temperature to give a red solution. The temperature was raised to 150° C. in about two hours. A clear solution was obtained for a short time at 150° C., but a gelantinous precipitate of polymer formed rapidly. Solvent was removed by baking three hours at 135° C. under vacuum, to give 24.2 grams of a brown polymeric powder. The infra-red spectrum of the polymer showed strong absorption bands at 5.60 and 5.84 microns, indicating the presence of imide groups. These bands were not present in either of the starting materials.

TABLE V.—DIELECTRIC STRENGTH OF ONE MIL FILMS

| Example | Temp., °C. | Diel. Strength, k.v. (D.C.) per Mil |
|---|---|---|
| XV | 25 | 4.5 |
| XV | 200 | 4.0 |
| XVI | 25 | 5.5 |
| XVI | 200 | 4.5 |

We claim as our invention:

1. An amide-modified polyimide having the repeating unit:

[structure]

in which $n$ is an integer of at least 5 and R represents a divalent radical selected from the group consisting of

[structures]

in which $x$ is an integer of from 1 to about 500, and in which R' represents a tetravalent radical selected from the group consisting of

[structures]

2. An amide-modified polyimide having the repeating unit:

[structure]

in which $n$ is an integer of at least 5 and R represents a divalent radical selected from the group consisting of

[structures]

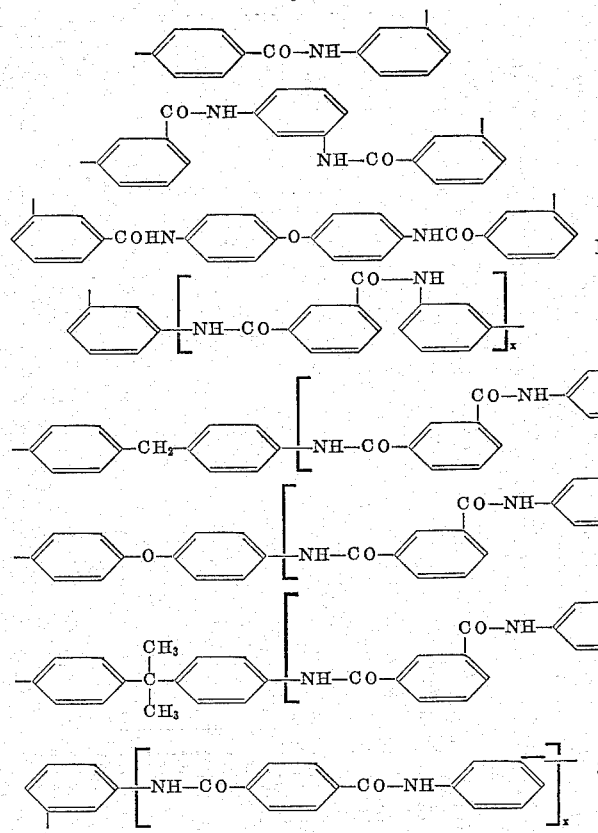

in which x is an integer of from 1 to about 500.

3. An electrical conductor having insulation therearound, said insulation comprising the resinous amide-modified polyimide of claim 1.

4. An electrical conductor having insulation therearound, said insulation comprising a cured amide-modified polyimide having the repeating unit:

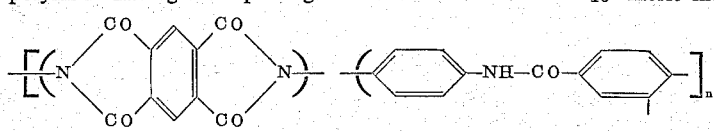

wherein n is an integer of at least 5.

5. A process which comprises (A) reacting at least one aromatic dianhydride selected from the group consisting of pyromellitic dianhydride
3,3',4,4'-benzophenonetetracarboxylic dianhydride
3,3',4,4'-biphenyltetracarboxylic dianhydride
bis(3,4-dicarboxyphenyl)ether dianhydride
bis(3,4-dicarboxyphenyl)sulfide dianhydride
bis(3,4-dicarboxyphenyl)sulfone dianhydride
bis(3,4-dicarboxyphenyl)methane dianhydride
2,2-bis(3,4-dicarboxyphenyl)propane dianhydride
2,3,6,7-naphthalenetetracarboxylic dianhydride
1,2,5,6-naphthalenetetracarboxylic dianhydride
1,4,5,8-naphthalenetetracarboxylic dianhydride with a molar excess of at least one primary aromatic diamine selected from the group consisting of m-phenylene diamine, p,p'-diamino phenyl methane, p,p'-diamino diphenyl ether, p,p'-diamino diphenyl sulfide, and p-phenylene diamine in the presence of a solvent, (B) reacting the product thus obtained in (A) with at least one phenylene diacyl halide selected from the group consisting of isophthaloyl chloride and terephthaloyl chloride, said halide being employed in an amount sufficient to react with substantially all of the remaining amino groups present in the product of (A).

6. A process which comprises (A) reacting at least one aromatic dianhydride selected from the group consisting of pyromellitic dianhydride
3,3',4,4'-benzophenonetetracarboxylic dianhydride
3,3',4,4'-biphenyltetracarboxylic dianhydride
bis(3,4-dicarboxyphenyl)ether dianhydride
bis(3,4-dicarboxyphenyl)sulfide dianhydride
bis(3,4-dicarboxyphenyl)sulfone dianhydride
bis(3,4-dicarboxyphenyl)methane dianhydride
2,2-bis(3,4-dicarboxyphenyl)propane dianhydride
2,3,6,7-naphthalenetetracarboxylic dianhydride
1,2,5,6-naphthalenetetracarboxylic dianhydride
1,4,5,8-naphthalenetetracarboxylic dianhydride with a molar excess of at least one primary aromatic diamine selected from the group consisting of m-phenylene diamine, p,p'-diamino diphenyl methane, p,p'-diamino diphenyl ether, p,p'-diamino diphenyl sulfide, and p-phenylene diamine in the presence of a solvent, (B) reacting the product thus obtained in (A) with at least one phenylene diacyl halide selected from the group consisting of isophthaloyl chloride and terephthaloyl chloride, said halide being employed in an amount sufficient to react with substantially all of the remaining amino groups present in the product of (A), whereby a soluble polymeric intermediate is formed, and heating said intermediate to convert the same to a cured, insoluble solid product.

7. A process for preparing an insulated electrical conductor which comprises reacting m-amino-benzoyl-p-aminoanilide in a suitable solvent with a substantially equimolar amount of at least one aromatic dianhydride selected from the group consisting of pyromellitic dianhydride
3,3',4,4'-benzophenonetetracarboxylic dianhydride
3,3',4,4'-biphenyltetracarboxylic dianhydride
bis(3,4-dicarboxyphenyl)ether dianhydride
bis(3,4-dicarboxyphenyl)sulfide dianhydride
bis(3,4-dicarboxyphenyl)sulfone dianhtydride
bis(3,4-dicarboxyphenyl)methane dianhydride
2,2-bis(3,4-dicarboxyphenyl)propane dianhydride
2,3,6,7-naphthalenetetracarboxylic dianhydride
1,2,5,6-naphthalenetetracarboxylic dianhydride
1,4,5,8-naphthalenetetracarboxylic dianhydride to form a soluble polymeric intermediate, depositing a coating of said intermediate upon an electrical conductor, and heating the deposited intermediate coating to convert the same to a cured, insoluble solid product.

8. A process which comprises (A) reacting pyromellitic dianhydride with a molar excess of at least one primary aromatic diamine selected from the group consisting of m-phenylene diamine, p,p'-diamino diphenyl methane, p,p'-diamino diphenyl ether, p,p'-diamino diphenyl sulfide, and p-phenylene diamine in the presence of a solvent, (B) reacting the product thus obtained in (A) with at least one phenylene diacyl halide selected from the group consisting of isophthaloyl chloride and terephthaloyl chloride, said halide being employed in an amount sufficient to react with substantially all of the remaining amino groups present in the product of (A).

9. A process which comprises (A) reacting pyromellitic dianhydride with a molar excess of at least one primary aromatic diamine selected from the group consisting of m-phenylene diamine, p,p'-diamino diphenyl methane, p,p'-diamino diphenyl ether, p,p'-diamino diphenyl sulfide, and p-phenylene diamine in the presence of a solvent, (B) reacting the product thus obtained in (A) with at least one phenylene diacyl halide selected from the group consisting of isophthaloyl chloride and terephthaloyl chloride, said halide being employed in an amount sufficient to react with substantially all of the remaining amino groups present in the product of (A), whereby a soluble polymeric intermediate is formed, and heating said intermediate to convert the same to a cured, insoluble solid product.

10. A process for preparing an insulated electrical conductor which comprises reacting m-amino-benzoyl-p-aminoanilide in a suitable solvent with a substantially equimolar amount of pyromellitic dianhydride to form a soluble polymeric intermediate, depositing a coating of said intermediate upon an electrical conductor, and heating the deposited intermediate coating to convert the same to a cured, insoluble solid product.

11. An insoluble film characterized by improved physical and electrical properties, said film having been prepared from the resinous composition of claim 1.

12. A process which comprises (A) reacting benzophenonetetracarboxylic dianhydride with a molar excess of at least one primary aromatic diamine selected from the group consisting of m-phenylene diamine, p,p'-diamino diphenyl methane, p,p'-diamino diphenyl ether, p,p'-diamino diphenyl sufide, and p-phenylene diamine in the presence of a solvent, (B) reacting the product thus obtained in (A) with at least one phenylene diacyl halide selected from the group consisting of isophthaloyl chloride and terephthaloyl chloride, said halide being employed in an amount sufficient to react with substantially all of the remaining amino groups present in the product of (A).

13. A process which comprises (A) reacting 1,4,5,8-naphthalenetetracarboxylic dianhydride with a molar excess of at least one primary aromatic diamine selected from the group consisting of m-phenylene diamine, p,p'-diamino diphenyl methane, p,p'-diamino diphenyl ether, p,p'-diamino diphenyl sulfide, and p-phenylene diamine in the presence of a solvent, (B) reacting the product thus obtained in (A) with at least one phenylene diacyl halide selected from the group consisting of isophthaloyl chloride and terephthaloyl chloride, said halide being employed in an amount sufficient to react with substantially all of the remaining amino groups present in the product of (A).

References Cited by the Examiner
UNITED STATES PATENTS 2,710,853  6/55  Edwards et al. _____ 260—78
2,867,609  1/59  Edwards et al. _____ 260—78

FOREIGN PATENTS 570,858  7/45  Great Britain.

WILLIAM H. SHORT, *Primary Examiner.*